United States Patent
Young

Patent Number: 5,852,673
Date of Patent: Dec. 22, 1998

[54] METHOD FOR GENERAL IMAGE MANIPULATION AND COMPOSITION

[75] Inventor: Fredric S. Young, Los Altos, Calif.

[73] Assignee: Chroma Graphics, Inc., Burlingame, Calif.

[21] Appl. No.: 754,731

[22] Filed: Nov. 21, 1996

Related U.S. Application Data

[63] Continuation-in-part of Ser. No. 624,035, Mar. 27, 1996, abandoned.

[51] Int. Cl.[6] ........................................................ G06K 9/00
[52] U.S. Cl. ............................................. 382/164; 358/518
[58] Field of Search .................................. 382/162, 164, 382/165, 167, 253; 345/150, 199; 358/518, 520; 395/131

[56] References Cited

U.S. PATENT DOCUMENTS

| | | | |
|---|---|---|---|
| 5,416,848 | 5/1995 | Young | 382/191 |
| 5,461,493 | 10/1995 | Venable | 358/520 |
| 5,473,736 | 12/1995 | Young | 358/518 |
| 5,638,190 | 6/1997 | Geist | 358/520 |

*Primary Examiner*—Amelia Au
*Assistant Examiner*—Samir Ahmed
*Attorney, Agent, or Firm*—Townsend and Townsend and Crew LLP; Kenneth R. Allen

[57] ABSTRACT

Methods are provided for carrying out a selection step and a blending step of a process of photorealistically reconstructing and manipulating a portion of a photograph or digital image, such as a segment or a layer, in order to minimize transition discontinuities and to provide optimum speed in the segmenting of the image, which is a function of increasing importance in a production environment. In the selection step, an image is classified into foreground and background states and regions, which could be limited to a selected layer of a final image. A vector is constructed which maps separation distances in a specialty space such as HSV space between the background region in a background state and the foreground region in a new foreground state. Difference vectors between the old and new foreground states are used to facilitate the mapping via a transition path which occupies the portion of specialty space where all the edge pixels between the foreground and the background parameters are located. An object in a portion of an image which has been manipulated is blended back into the photograph or image in a natural way using the transition vector. In addition, methods for carrying out the manipulating step of this process involve a variable vector quantization step to reduce the number of parameter elements in an image.

8 Claims, 6 Drawing Sheets

METHOD FOR GENERAL IMAGE MANIPULATION AND COMPOSITION

CROSS-REFERENCE TO RELATED APPLICATION

This application is a continuation-in-part patent application of patent application Ser. No. 08/624,035, filed Mar. 27, 1996 now abandoned entitled METHOD FOR RECOLORING IMAGES, the content of which is incorporated herein by reference and made a part hereof.

BACKGROUND OF THE INVENTION

This invention relates to general image manipulation and composition, including color manipulation, in computer graphics. Specifically the invention relates to methods which improve the speed, power, and efficiency with which portions of images can be selected, manipulated on a pixel-by-pixel basis in image space or in an isospace (wherein a point represents an index position in the space). The invention allows selection and blending to be used with conventional modification methods without leaving any visible signs that the image was manipulated.

Production level image manipulation by digital graphic artists is often carried out under severe time pressure. Furthermore, application of special effects "filters" to portions of images has become a major tool for content creation by graphic artists, as has isolating segments of images as layers for composition and collage.

Three separate functions are always involved in the task of photographic, mathematical and artistic image manipulation. These are: (1) segmenting or masking the image so as to operate on only a portion, (2) applying a filter or other image manipulation function, and (3) blending the modified portion or isolated layer of an image segment of the image back into the original image without leaving any traces of the manipulation process.

Parent patent application Ser. No. 08/624,035 filed Mar. 27, 1996, entitled METHOD FOR RECOLORING IMAGES (which is not prior art) recognized for the first time a specific technique for color manipulation. The focus therein was limited to color space manipulation.

The state of the art for segmenting an image for composition and the like is exemplified by the tools in a product such as Adobe PhotoShop from Adobe Systems of Mountain View, Calif. The tools therein for image segmentation fall into two categories: marquee tools, which provide an outline around a section of an image; and color range selection tools known as "magic wands," which segment an image based on color range. Among marquee-type tools there are automatic tools, which outline based on simple geometric shapes, such as rectangles or ovals, and freehand tools. Using the freehand marquee tool the user must laboriously and manually trace an outline around the desired section. The problem is that for an object such as a sweater, there are discontinuities such as fibers along the edge making it virtually impossible for a marquee user to trace an outline around the sweater which neatly separates out the background. "Magic wand" tools attempt to select automatically everything within a contiguous spatial region within a color range around a chosen color. The tolerance in the RGB color range can be varied. The problem with the magic wand tool is that it operates linearly on color using separate orderings on a mechanical color space of red, green, and blue (RGB) components, or cyan, magenta, yellow, and black (CMYK) components, whereas the color space most useful for visual artists is more conveniently ordered in the three-dimensional color space of hue, saturation and value [luminance] (HSV). The color variations in a natural object are such that they cannot be selected as a range using these mechanical linear channel functions. As any user of Adobe Photoshop knows well, the "magic wand" tool cannot be used to select a portion of a complexly-colored, naturally-shaded image conveniently using color range.

Another product having relevant tools is FRACTAL DESIGN PAINTER from Fractal Design Corporation of Aptos, Calif., which is a product for computer-aided painting with natural brush strokes and natural media. However, this product is not used and cannot be used independently for image editing. Because this is a program for conventional visual artists, it does its color selection in Hue Saturation and Value (HSV) space, which has been determined by the present inventor and revealed in the parent application hereto to be superior to any known technique for color selection processes. The product FRACTAL DESIGN PAINTER has some rudimentary blending functions, but they are inferior to the blending techniques disclosed in the parent application, although they are comparable to the blending techniques found in Adobe Photoshop.

The parent application provides integrated selection, recoloring and reblending steps, but it does not contemplate that a user select or apply filters and reblend without color change.

SUMMARY OF THE INVENTION

According to the invention, methods are provided for carrying out a selection step and a blending step of a process of photorealistically reconstructing and manipulating a portion of a photograph or digital image, such as a segment or a layer, in order to minimize transition discontinuities and to provide optimum speed in the image segmentation step, (which is often the rate-limiting step in the work flow for image editing and the prepress production environment. In the selection step, an image is classified into foreground and background states and regions, which could be limited to a selected layer of a final image. A vector is constructed which maps separation distances in a specialty space such as HSV space between the background region in a background state and the foreground region in a new foreground state. Difference vectors between the old and new foreground states are used to facilitate the mapping via a transition path which occupies the portion of specialty space where all the edge pixels between the foreground and the background parameters are located. An object in a portion of an image which has been manipulated is blended back into the photograph or image in a natural way using the transition vector.

In addition, methods for carrying out the manipulating step of this process involve a variable vector quantization step to reduce the number of parameter elements in an image to formulate a coarse space graining which can be used to both segment the image and facilitate assignment of pixels to foreground, background and transition regions, which in turn facilitates blending according to the invention.

A system according to this invention is a fully integrated solution for manipulating an image which integrates the selection, manipulation, which can include recoloring, and blending functions to process the image extremely rapidly and which requires little technical expertise to use.

This invention extends the art of color image manipulation to make it possible for novices to carry out economically-significant general manipulation processes which are currently beyond even the abilities of experts.

The invention will be better understood by reference to the following detailed description, taken in conjunction with the following drawings.

DESCRIPTION OF SPECIFIC EMBODIMENTS

Figure 1:
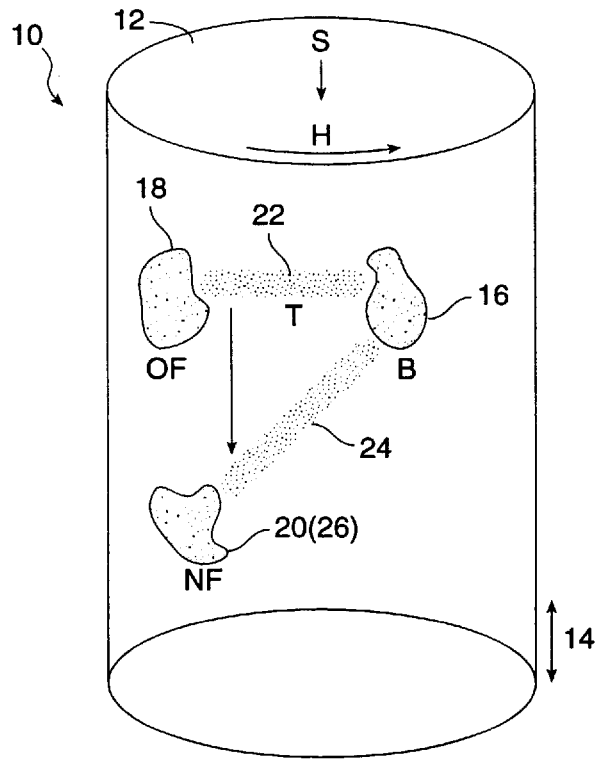
FIG. 1 is representation of color manipulation in HSV color space.

Referring to FIG. 1, there is shown a visualization of Hue, Saturation, Value (HSV) color space 10 with a representation of processes of the invention. The HS plane 12 (where hue is the angular value in radians and the saturation is a vector toward the circumference of 100% saturation) is a chromaticity representation, and the V axis 14 (the length of the cylinder) is the luminance representation. In true-color 24-bit graphics, what appears to the eye to be a single color may be as many as tens of thousands of colors in full resolution color space. Shown in HSV space is a cluster 16 of first background colors, a cluster 18 of original foreground colors, a cluster 20 of source palette colors, a transition path region 22 between the background cluster 16 and the foreground cluster 18, a cluster 19 of second background colors which can be substituted for the first background color cluster 16 (as for example where a new background region is substituted for the original background region), and a transition path region 25 from the second background color region 19 and the new foreground color region 20. In a natural image, the transition path region 22 is along a continuous transition vector between the background color cluster 16 and an unchanged foreground color cluster 18. (At lower than full color resolution and full image resolution, the vector may be granular.) According to the invention, in the process of blending in a recolored or otherwise-processed image segment, the path region 22 is remapped to provide a transition between any indeterminate point in any background region color cluster 16 and the source palette color cluster 20. Hence, the path 22 is redirected from its termination in the surface of the foreground color region cluster 18 to a new termination in the surface of a new foreground color region 26 which is contiguous with the boundaries of the source palette color cluster 20 while maintaining a path to the termination in the surface of either the first or the second background region color cluster 16 or 19. In the above-described process, the mask segment (18) is blended back into the original image (as represented by the background 16) after recoloring or other image processing or filtering operation. In some cases, this masked image segment 18 will be extracted from the original image as a separate layer and composited into another image layer. Therefore, in the present invention, the transition path may be from an unchanged extreme pixel in the segmented portion of the image to the background in another image, into which the segment layer is to be blended.

Figure 2A:
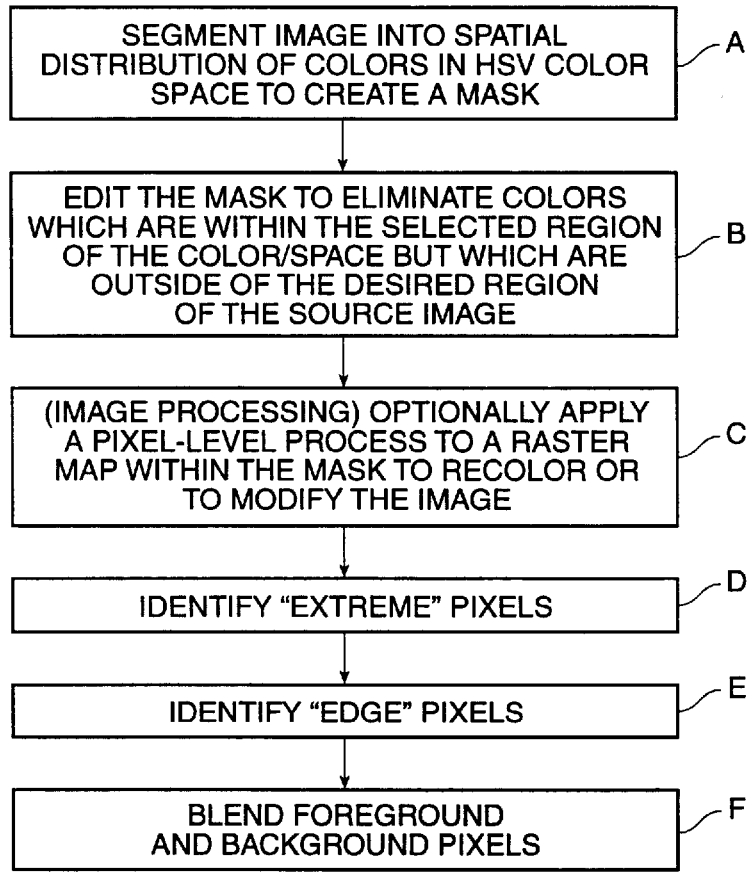
FIG. 2A is a flow chart of a general image manipulation and composition process according to the invention.
Figure 2B:
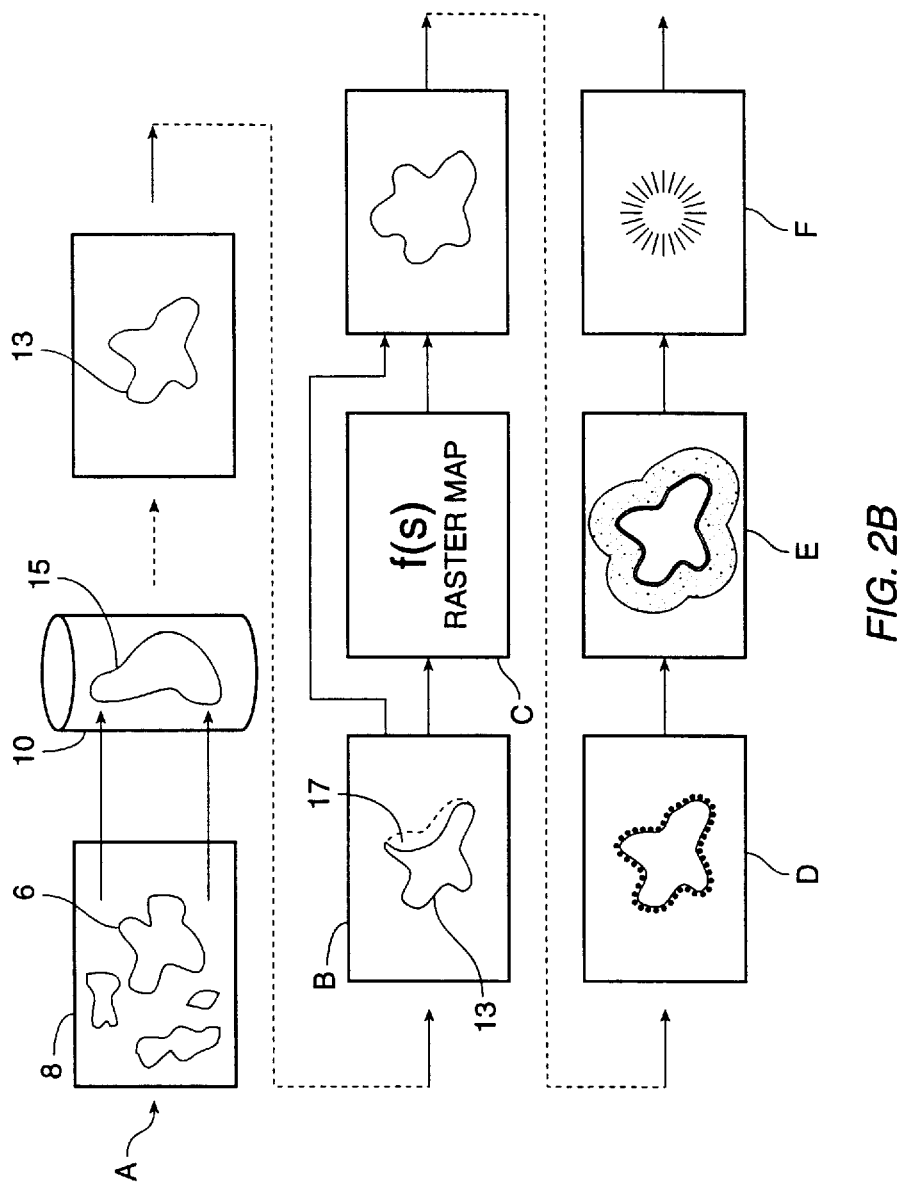
FIG. 2B is a pictorial representation of results of the steps in the process according to the invention.

Referring to FIG. 2A and FIG. 2B together, there are shown a flow chart and a series of suggestive illustrations of a general manipulation process employed according to the invention. A portion 6 of an image 8 is segmented by preparing a mask 13 based on a subset 15 of colors in the image found within a single region 15 of color space (Step A). As preparation, a portion of the colors in the image may be sampled in order to determine the subset 15 of colors to be included in the segment or mask. (Alternately, one could operate on HSV ranges or on user-selected chosen colors.)

The mask 13 may then be edited to apply an adjustment 17 of the colors to be included in the mask (Step B). This step is used to selectively erase unwanted colors included in the color mask but found only in locations of the spatial image which are not in the desired region of the source image. (Colors could be added, too.)

An optional step is to further process the image at a pixel level in image space, or more specifically apply a pixel-level process to a raster map within the mask in order to recolor or modify the image (Step C).

Figure 8:
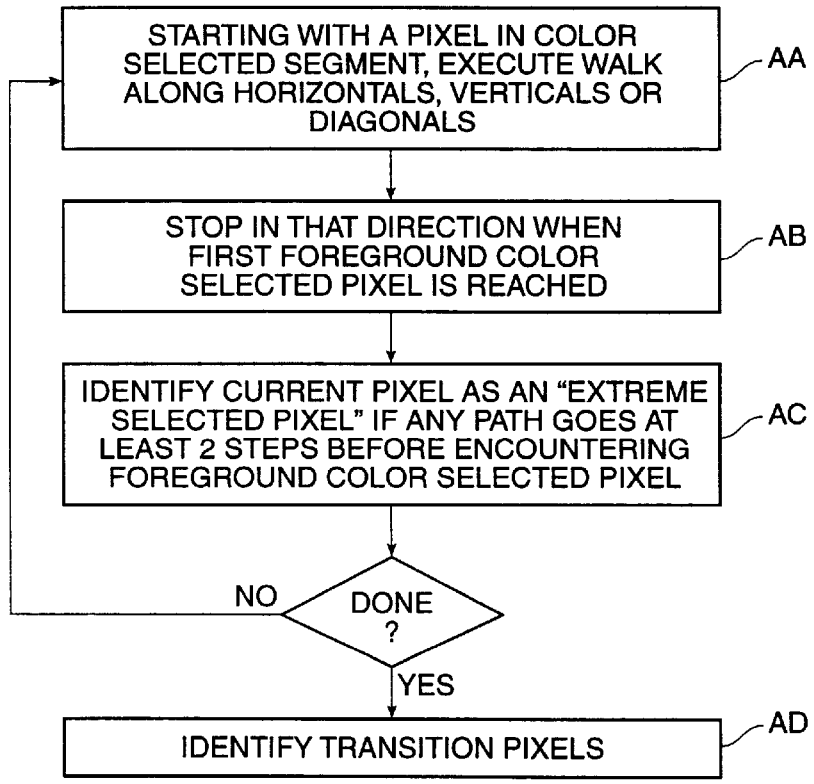
FIG. 8 is a flow chart illustrating a first search for extreme color-selected pixels according to the invention.

Important process steps are to identify the "extreme" pixels (Step D) and to identify "edge" or "transition" pixels (Step E), since these processes facilitate blending (Step F) of the foreground segment matched by the mask to the background of the original or of another image, such as a composite image, irrespective of whether the foreground segment was modified. FIG. 8, discussed below, outlines one appropriate identification process for extreme pixels. Edge pixels can be identified by taking derivatives and using maxima and minima over the extreme pixels, as discussed in connection with FIG. 8. The step of blending (Step F) is discussed as FIG. 5.

Figure 3:
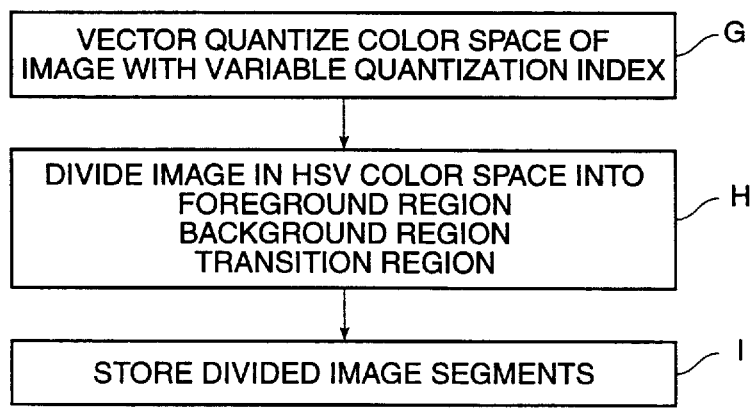
FIG. 3 is a flow chart of a foreground color range selection step according to the invention.

According to the invention, the improvement is in part in the color selection step, in the recoloring step and in the blending step. Referring to FIG. 3, the improved color selection step includes optionally vector quantizing color space of the image with a variable quantization index (Step G). This can be used to aid in the creation of the mask. Thereafter is the step of classifying an image of pixels as represented in HSV color space 10 into a foreground region 20, a background region 16 and a transition region 22 composed of pixels (Step H) and then storing the resultant image segments in their HSV color space form for subsequent manipulation (Step I). The pixels remain at their source positions in geometric space, but their values in HSV color space are subject to change as hereinafter explained.

Figure 4:
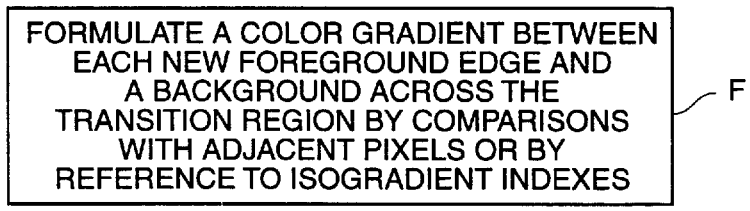
FIG. 4 is a flow chart of a first blending step according to the invention.

Further according to the invention and referring to FIG. 4, the blending step is improved by formulating a color gradient in HSV color space 10 between a new foreground color at the "edge" of a new foreground region 26 and an original background color or a new background color for the background region (which is "nearby" in geometric image space) along a new transition path region 24 or 25, the gradient defining a seamless color transition between the foreground region 26 in its new color state and the background region 16 or 19 with its original or substitute color state without introducing artificial discontinuities (Step J). When viewed in color space (FIG. 1), this is a very easy concept to understand as a displacement of the cluster defining the foreground region, and optionally substitution of the cluster defining the background region, although it is not intuitively apparent if the process were observed in operation on an image in geometric space. In addition, the present invention exploits subtleties which increase the utility of the translation concept. The comparison with adjacent pixels is but one mechanism for formulating a color gradient.

Figure 5:
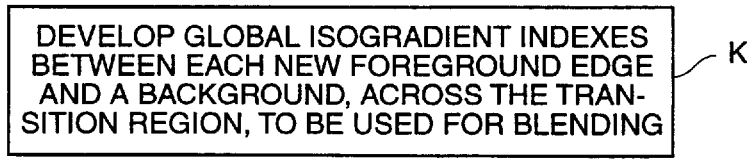
FIG. 5 is a flow chart of a second blending step according to the invention.

Referring to FIG. 5, the precursor to the blending step is an alternative formulation of the gradient using global isogradient indexes (Step K). In particular, the isogradient indexes are groups of pixels whose colors share the same location in color space. The indexes are used in a color sorting algorithm as described in U.S. Pat. No. 5,416,848 issued May 16, 1995 entitled METHOD AND APPARATUS FOR MANIPULATING COLORS OR PATTERNS USING FRACTAL OR GEOMETRIC METHODS, invented by the present inventor. The content thereof is incorporated herein by reference and made a part hereof. Both of the color gradients are employed in a color remapper. The blending step (Step F, FIG. 4, FIGS. 2A, 2B) may then become a simple interpolation in HSV space or a simple table lookup interpolation if isoindexing has been used. Otherwise, the blending step relies on comparisons with adjacent pixels.

Figure 6:
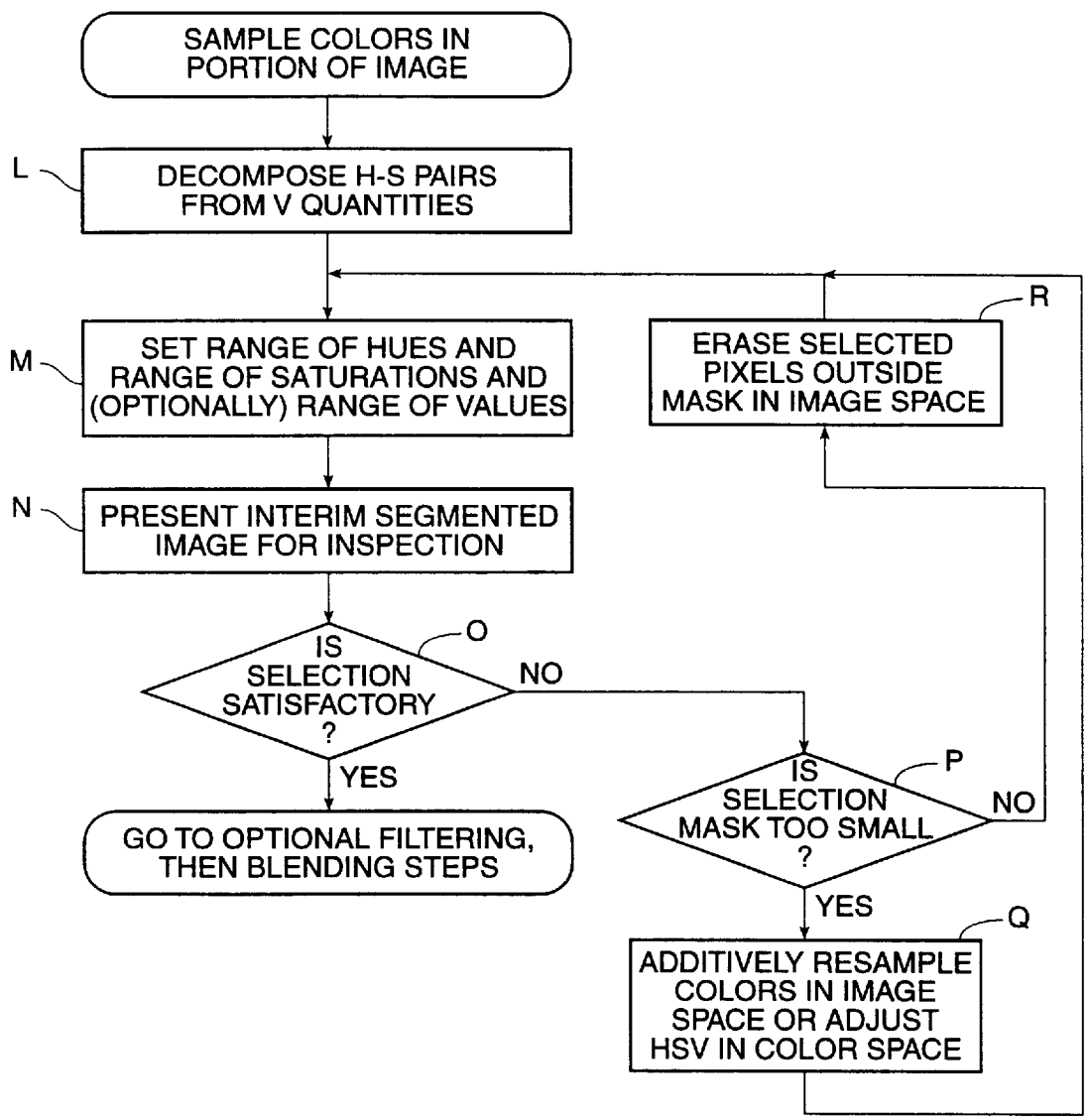
FIG. 6 is a flow chart illustrating the creation of a mask according to the invention.
Figure 7:
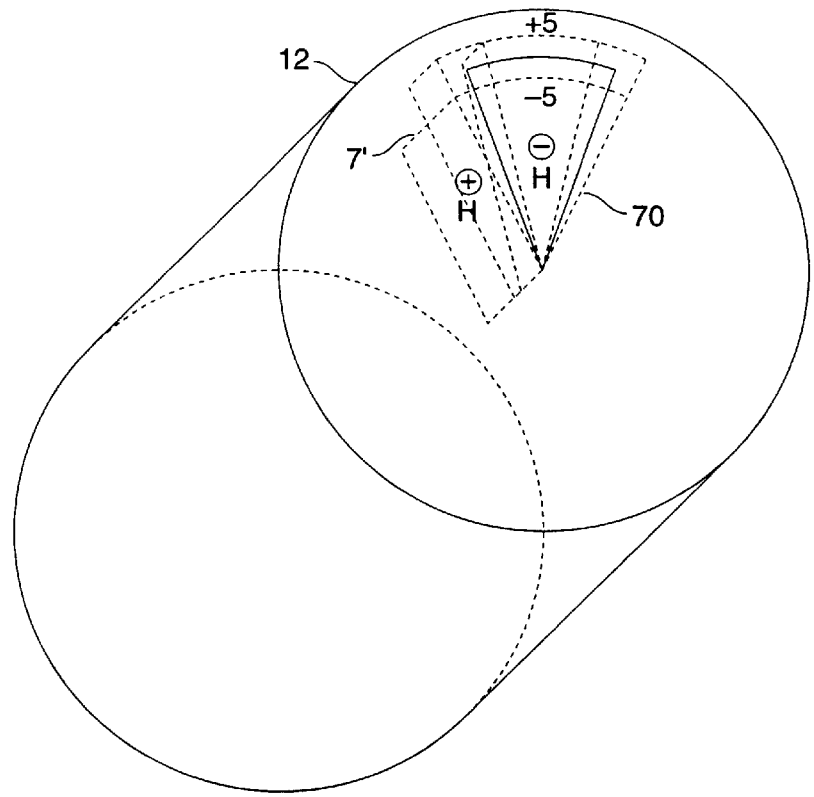
FIG. 7 illustrates a segment of HSV color space showing how a selected region can be modified in HSV space.

An improvement in the segmenting or selection step of the known prior art is to use the vector quantized source image to formulate a coarse color space graining, graining being an index for the segmenting step to facilitate assignment of pixels to the foreground region, to the background region and to the transition (edge) regions. Referring to FIG. 6, for this selection step, the sampled color range is decomposed into the color and gray scale components (Step L), and the range of hues and saturation values is determined (Step M). This will be a distribution of points confined to a wedge-shaped subsection 70 of the two dimensional hue-saturation color space produced by compressing the line comprising the value axis of the HSV color space to a single point in the HS plane 12 (FIG. 7). Further flexibility is available by control of the third dimension (Value or brightness) depth 71 of the three-dimensional color space (FIG. 7).

All of the pixels of the image which are potentially identified as those to be included in the mask or segment will be presented at their positions in the image (on a screen for example) for interim inspection (Step N). Thus all pixels whose colors in the image have hue and saturation values which are within the selected color space wedge 70 will be presented for inspection at their positions in the image of the selected region. (If brightness criteria are employed, some of the Value portion may be eliminated.) The user may then approve or reject the segmenting (Step O). If not approved, then new hue and saturation values must be determined, although a different mechanism may be used.

Specifically, if the size of the selection mask is adequate (Step P), then selected pixels outside of the mask in image space can be erased even if inside the chosen range of Hue, Saturation and Brightness (Value) in color space (Step R), and the range setting step (Step M) can be reimplemented. If too little of the image has been selected (Step P), the user can cause the colors in image to be additively resampled or can adjust, without resampling the image, the HSV values in color space, i.e., adjust the size of the wedge 70 (FIG. 7) which confines the selection in the compressed color space (Step Q). This adjustment can include both globally changing Hue Saturation or Value ranges or more selectively modifying only selected portions of those ranges. The arc of the wedge 70 represents a range of hues, the length of the wedge from the center which is along a radius represents the saturation range, and the depth of the wedge represents the brightness range. The radius will include the origin if the saturation range includes 0% and will include a point on the circumference if the saturation range includes 100%. The selected hue range can be increased or decreased and the selected saturation range can be increased or decreased independently, giving fine control over the color selection process.

When the selection process operates on only two dimensions of the compressed color space, making the selection process independent of the numerical value of the third color space dimension, brightness, which represents gray scale intensity. Because this third dimension carries all of the information for lightness and darkness changes, this method eliminates a difficulty with current color selection methods which work in RGB space, and which distributes the light-dark information among three color dimensions which are not independent of one another. It has been found that such color selection methods are less than satisfactory and may be considered ineffective. Nevertheless, manipulation in the three dimensions of HSV space allows the third dimension to be used for only selected masking processes, providing additional flexibility.

This invention is a true color selection tool because it can operate on the color components independent of black-white or gray scale components, and it therefore allows masking to be based solely on color and therefore to be independent of image structure.

Recoloring of the selected (foreground) pixels should occur before the recoloring and the identification of the transition pixels.

Once the foreground color selection process has been completed, the foreground color pixels can be recolored. Previous recoloring processes could be used. Alternatively, new, as yet to be discovered, recoloring processes can be used.

Figure 9:
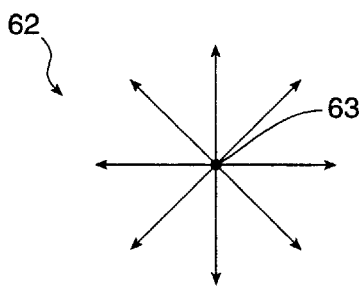
FIG. 9 is an illustration of a search mechanism for searching for transition pixels according to the invention.

After recoloring the foreground using one of the foreground recoloring method, a process is conducted (FIG. 8) to identify a set of extreme pixels, and then it is repeated from the identified extreme pixels to identify transition pixels. For example, starting with each pixel in the color selected segment, a search is directed by a mechanism 62 (FIG. 9) to follow the vertical columns, the horizontal rows and the diagonals from the starting pixel 63 (Step AA). The search along any direction of the spokes is stopped in that direction when the mechanism 62 encounters the first pixel selected in the color selection step (Step AB). The pixel so reached is identified as an "extreme pixel" (Step AC) for subsequent processing. Any pixel from which there is a walk of at least two steps in any direction before another selected pixel is encountered is identified as an "extreme pixel." The process is repeated for all pixels in the foreground selected region (Step AA).

Figure 10:
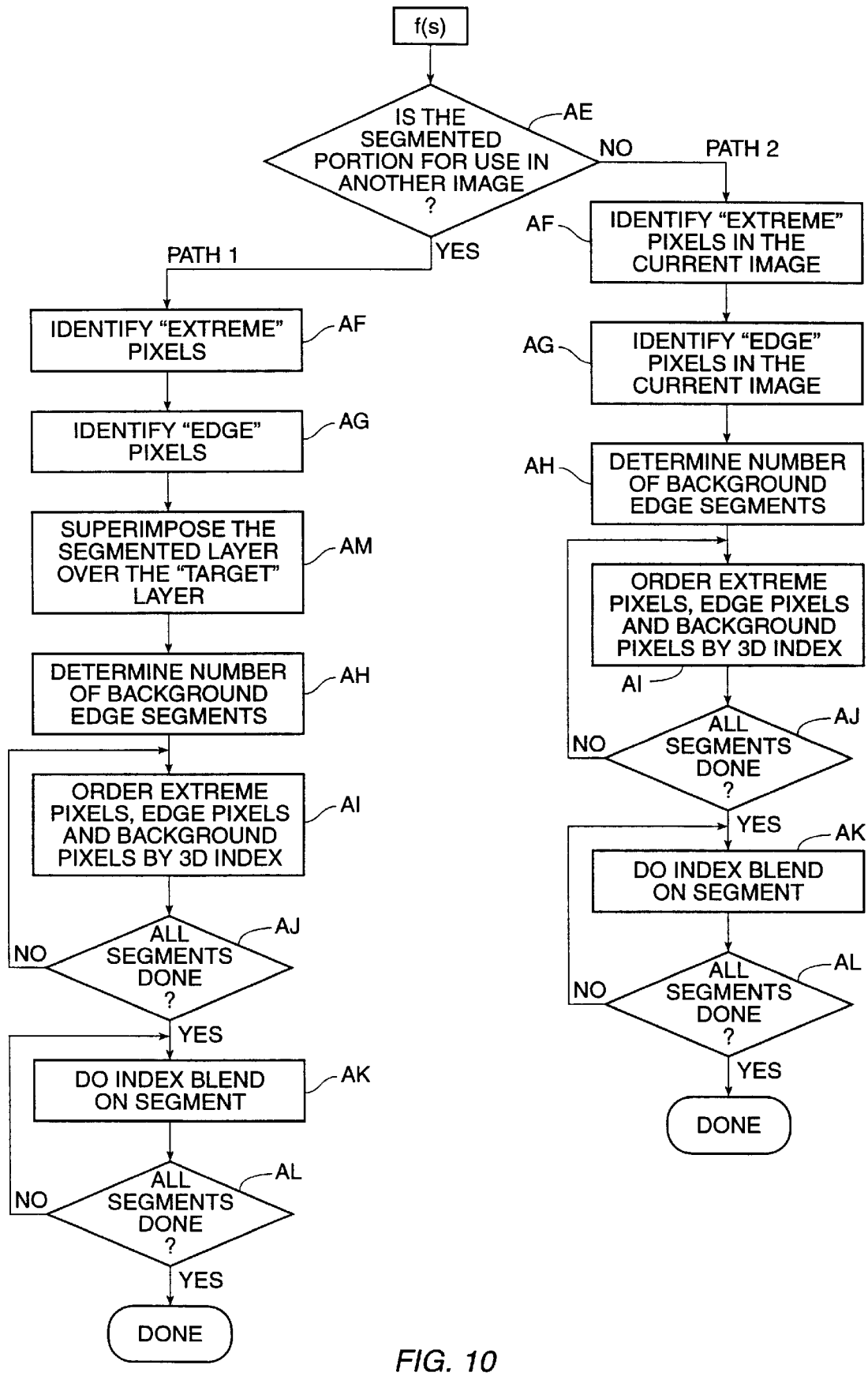
FIG. 10 is flow chart of methods for identifying, possibly modifying, and reblending edge pixels of various images.

When done, a similar walk is conducted (Step AD) from the "extreme pixels" to identify transition pixels which are to be recolored in the blending step (Step D, FIG. 2). For an image with pixels having eight neighbor pixels in the Cartesian image, the eight-direction crawler mechanism 62 (FIG. 12) is placed at each extreme pixel and then a "walk" is performed along each spoke until either a pixel in the color selection segment is reached, or about eight steps have been taken. For each walk of at least one step, the difference distance in three dimensional color space is calculated between each adjacent pixel and plotted as a function of discrete position along the walk. (FIG. 10 and FIG. 11 are alternatives for a difference distance plot vs. position along a walk). The maximum difference distance in colors space 64 of the curve is determined and the pixel 65 which is one or two further steps from that position is identified as a "background" pixel. The distance in 3D color space between the background pixel and the extreme pixel at the origin of the walk is calculated, and the total distance is divided by the number of steps in the walk. The point away from the extreme, at that distance, becomes a "no recoloring" point, i.e., the background value. The set of pixels along the walk between the selected pixel and the no recoloring point are recolored by interpolation along a natural line in color space between the point representing the HSV components of the nonrecolored background pixel and the related extreme pixel at the vertex of the crawler.

The blending step is the procedure for producing the transition pixel recolorization in the region between the cluster of points representing the new foreground color and the cluster of points representing the original background color. The colors of these transition pixels will all fall along points within a cylindrical region or a cluster of vectors in color space. In accordance with the invention, the blending step is improved by employing the two difference vectors in HS and in V to define the endpoints of the transition vector or cluster of transition vectors along the path in color space between the cluster of points representing color of the background and the cluster of points representing color in the foreground, and then by mapping the transition vector from the background color cluster to the new foreground color cluster. By mapping, it is understood that the color at the end point in the foreground is changed the full amount from the old foreground color to the new foreground color, that the color at the origin endpoint in the background is not changed, and that all of the colors along the original transition vector and the new transition vector is changed by an amount proportional to the ratio of the distance from the origin to the pixel and the distance from the origin and the endpoint. The crawler function, described above for finding the location in the image of the transitions, is used in the blending step to determine which walk from an extreme pixel is the longest. The shortest walk which serves to identify an edge may serve as the baseline for recoloring those transition pixels which are not part of a walk long enough to identify the edge of the image using the location of the maximum on the distance curve (See FIG. 9).

Referring now to FIG. 10, a form of pixel-based blending is disclosed, using what is known here as a global index blend. Using as input the results of an operation on the raster map [f(s)], which could be no operation, the segmented portion is tested (Step AE) to determine whether it is to be used with another spatial image (path 1) or the source image (path 2). The processes for the different images are similar but distinguishable. Foreground and background colors are used along with the sizes of the edges to determine the details of the blending operations.

For same image processes, "extreme" pixels in the current (same) image segment are identified (Step AF), along with the "edge" or transition pixel identification step (Step AG).

Then the number of background edge segments are determined by inspection of the segmentation of color space (Step AH). This is basically a visual inspection to determine major color space groupings in the background. Then, in accordance with the index blend method, extreme pixels, the edge pixels and the background pixels are ordered according to a three dimensional index across the color space (Step AI). (This technique is disclosed in U.S. Pat. No. 5,416,848 incorporated and mentioned herein.) This is done for each edge segment (Step AJ). Then the index blend step is carried out (Step AK). It is also performed on each edge segment (Step AL) until the entire masked portion is done and blended into the original image.

The operation for cross image mapping (path 1 is similar. However, after edge pixels are identified (Step AG), where image elements are treated as layer the segmented layer is superimposed over the target layer (Step AM) before determining the number of background edge segments (Step AH). All other steps are otherwise identical (Steps AI, AJ, AK, AL).

The process can be still further modified by deleting the indexing step (Step AI) and by modifying the blending step (Step AL) so as to blend the edge according to distance in color space between physically neighboring foreground and background pixels.

The invention has now been explained with reference to specific embodiments. Other embodiments will be apparent to those of ordinary skill in the art. It is therefore not intended that this invention be limited except as indicated by the appended claims.

What is claimed is:

1. In a process of photorealistically processing a portion of a source image, to form a target image using a palette of colors, said process having at least a color selection step and a blending step, the improvement comprising:

in the color selection step, classifying each part of an image segment of the source image in a color space of at least three dimensions as a foreground region, a background region or a transition region; and in the blending step, formulating a color gradient between a new foreground color which has been selected by said color selection step and an original background color across said transition region, said gradient defining a seamless color transition between said foreground region and said background region without artificial discontinuities;

employing difference vectors to define an endpoint of a transition vector between said background color and said new foreground color; and mapping said transition vector from said background color to said new foreground color.

2. In a process of photorealistically processing a portion of a source image, to form a target image using a palette of colors, said process having at least a color selection step and a blending step, the improvement comprising:

in the color selection step, classifying each part of an image segment of the source image in a color space of at least three dimensions as a foreground region, a background region or a transition region; and in the blending step, formulating a color gradient between a new foreground color which has been selected by said color selection step and an original background color across said transition region, said gradient defining a seamless color transition between said foreground region and said background region without artificial discontinuities, further including a recoloring step, an improvement in the recoloring step comprising:

determining a first weighted average of colors in the color space of the foreground region of the source image;

providing a distribution of colors from the color palette;

determining a second weighted average of colors in the color space of a selected distribution region of the distribution of colors of the color palette; thereafter decomposing said first weighted average into a first H-S pair in HSV color space and a first value component;

decomposing said second weighted average into a second H-S pair and a second value component;

generating a first difference vector from the difference between said first H-S pair and said second H-S pair;

generating a second difference vector from the difference between said first value component and said second value component;

recoloring H-S components of said source image with said first difference vector; and recoloring said value component of said source image with second difference vector.

3. In the process of claim 2, the step of recoloring said H-S components comprising adding said first difference vector to said first H-S pair.

4. In the process of claim 3, the step of recoloring said value component comprising multiplying the value component in each selected foreground pixel of the target image by a function of said second difference vector.

5. In a process of claim 2, the improvement in the recoloring step comprising:

vector quantizing the color space of the target image to represent colors in the target image with a first variable quantization index; and vector quantizing the color points in the image segment of the source image with a second variable quantization index which can be used to map to the target image.

6. In the process of claim 5, an improvement in the segmenting step comprising using the vector quantized source image to formulate a coarse color space graining, said graining being an index for said segmenting step to facilitate assignment of pixels to said foreground region, said background region and said transition regions.

7. In the process of claim 5, an improvement in the recoloring step further comprising, on first selected pixels representing said foreground region, and using selected discrete color values of said color palette in an HSV color space:

selecting a first degree of granularity of the source image colors;

selecting a second degree of granularity of the color palette colors;

ordering the source image colors into first ordered sets of HSV vectors;

ordering the color palette colors into second ordered sets of HSV vectors; thereafter aligning said first ordered sets of HSV vectors with said second ordered sets of HSV vectors in accordance with said quantization indexes;

decomposing each pair of corresponding first and second HSV vectors into HS pairs and V components;

forming a first difference vector from differences in said HS pairs;

adding said first difference vector to an HS vector at its corresponding position in said foreground region;

forming a second difference vector from differences in said V components; and multiplying said second difference vector with the V component at its corresponding position in said foreground region.

8. In the process of claim 7, the improvement in the blending step comprising:

employing said first difference vector and said second difference vector to define an endpoint of a transition vector between said background color and said new foreground color; and mapping said transition vector from said background color to said new foreground color.

* * * * *